United States Patent
Duncan et al.

(10) Patent No.: US 6,859,529 B2
(45) Date of Patent: Feb. 22, 2005

(54) METHOD AND SYSTEM FOR SELF-SERVICE SCHEDULING OF INBOUND INQUIRIES

(75) Inventors: Daniel N. Duncan, Austin, TX (US); Alexander N. Svoronos, Springfield, NJ (US); Thomas J. Miller, Westfield, NJ (US)

(73) Assignee: Austin Logistics Incorporated, Austin, TX (US)

( * ) Notice: Subject to any disclaimer, the term of this patent is extended or adjusted under 35 U.S.C. 154(b) by 420 days.

(21) Appl. No.: 10/082,386

(22) Filed: Feb. 25, 2002

(65) Prior Publication Data

US 2002/0141561 A1 Oct. 3, 2002

Related U.S. Application Data

(63) Continuation-in-part of application No. 09/547,627, filed on Apr. 12, 2000.

(51) Int. Cl.[7] .............................................. H04M 3/00
(52) U.S. Cl. .................................. 379/266.1; 379/88.18
(58) Field of Search ........................... 379/88.18, 93.12, 379/208.01, 265.02, 266.01, 266.02, 266.1

(56) References Cited

U.S. PATENT DOCUMENTS

| | | | |
|---|---|---|---|
| 4,881,261 A | 11/1989 | Oliphant et al. | 379/215 |
| 5,040,208 A | 8/1991 | Jolissaint | 379/201 |
| 5,185,782 A | 2/1993 | Srinivasan | 379/67 |
| 5,335,269 A | 8/1994 | Steinlicht | 379/266 |
| 5,440,585 A | 8/1995 | Partridge, III | 375/261 |
| 5,444,774 A | 8/1995 | Friedes | 379/266 |
| 5,448,555 A | 9/1995 | Bremer et al. | 270/20 |
| 5,467,388 A * | 11/1995 | Redd et al. | 379/210.02 |
| 5,479,487 A | 12/1995 | Hammond | 379/67 |
| 5,499,289 A | 3/1996 | Bruno et al. | 379/220 |
| 5,499,291 A | 3/1996 | Kepley | 379/265 |
| 5,509,055 A | 4/1996 | Ehrlich et al. | 379/133 |
| 5,533,108 A | 7/1996 | Harris et al. | 379/201 |
| 5,537,436 A | 7/1996 | Bottoms et al. | 375/222 |
| 5,574,781 A | 11/1996 | Blaze | 379/220 |

(List continued on next page.)

OTHER PUBLICATIONS

Lucent's CentreVu® Advocate[SM] white paper; Lucent's CentreVu Advocate, Breakthrough Solutions for Your Success; Lucent Technologies 1999.

(List continued on next page.)

*Primary Examiner*—Bing Q. Bui
(74) *Attorney, Agent, or Firm*—Hamilton & Terrile LLP.; Robert W. Holland

(57) ABSTRACT

A method and system schedules inbound inquiries, such as inbound telephone calls, for response by agents in an order that is based in part on the forecasted outcome of the inbound inquiries. A scheduling module applies inquiry information to a model to forecast the outcome of an inbound inquiry. The forecasted outcome is used to set a priority value for ordering the inquiry. The priority value may be determined by solving a constrained optimization problem that seeks to maximize an objective function, such as maximizing an agent's productivity to produce sales or to minimize inbound call attrition. A modeling module generates models that forecast inquiry outcomes based on a history and inquiry information. Statistical analysis such as regression analysis determines the model with the outcome related to the nature of the inquiry. Operator wait time is regulated by forcing low priority and/or highly tolerant inbound inquiries to self service.

29 Claims, 3 Drawing Sheets

U.S. PATENT DOCUMENTS

| | | | |
|---|---|---|---|
| 5,627,884 A | 5/1997 | Williams et al. | 379/88 |
| 5,661,718 A | 8/1997 | Bremer et al. | 370/207 |
| 5,684,872 A * | 11/1997 | Flockhart et al. | 379/266.08 |
| 5,696,809 A * | 12/1997 | Voit | 379/22.01 |
| 5,717,747 A | 2/1998 | Boyle, III et al. | 379/201 |
| 5,721,770 A | 2/1998 | Kohler | 379/266 |
| 5,732,218 A | 3/1998 | Bland et al. | 395/200.54 |
| 5,740,238 A | 4/1998 | Flockhart et al. | 379/221 |
| 5,742,674 A | 4/1998 | Jain et al. | 379/209 |
| 5,751,795 A | 5/1998 | Hassler et al. | 379/93.17 |
| 5,754,639 A | 5/1998 | Flockhart et al. | 379/221 |
| 5,757,644 A | 5/1998 | Jorgensen et al. | 364/188 |
| 5,757,904 A | 5/1998 | Anderson | 379/265 |
| 5,825,870 A | 10/1998 | Miloslavsky | 379/265 |
| 5,828,747 A | 10/1998 | Fisher et al. | 379/309 |
| 5,838,682 A | 11/1998 | Dekelbaum et al. | 370/401 |
| 5,848,143 A | 12/1998 | Andrews et al. | 379/219 |
| 5,867,559 A | 2/1999 | Jorgensen et al. | 379/67 |
| 5,878,130 A | 3/1999 | Andrews et al. | 379/265 |
| 5,898,772 A | 4/1999 | Connors et al. | 379/265 |
| 5,903,641 A | 5/1999 | Tonisson | 379/266 |
| 5,903,877 A | 5/1999 | Berkowitz et al. | 705/26 |
| 5,905,793 A | 5/1999 | Flockhart et al. | 379/266 |
| 5,915,003 A | 6/1999 | Bremer et al. | 379/93.19 |
| 5,926,539 A | 7/1999 | Shtivelman | 379/266 |
| 5,930,337 A | 7/1999 | Mohler | 379/88.22 |
| 5,933,476 A | 8/1999 | Hansen et al. | 379/52 |
| 5,940,475 A | 8/1999 | Hansen | 379/52 |
| 5,943,395 A | 8/1999 | Hansen | 379/52 |
| 5,946,386 A | 8/1999 | Rogers et al. | 379/265 |
| 5,960,382 A | 9/1999 | Steiner | 704/2 |
| 5,982,873 A | 11/1999 | Flockhart et al. | 379/266 |
| 5,987,115 A | 11/1999 | Petrunka et al. | 379/265 |
| 5,991,293 A | 11/1999 | Buchanan et al. | 370/353 |
| 6,002,749 A | 12/1999 | Hansen et al. | 379/52 |
| 6,002,760 A | 12/1999 | Gisby | 379/266 |
| 6,009,162 A | 12/1999 | Bogart et al. | 379/265 |
| 6,014,439 A | 1/2000 | Walker et al. | 379/266 |
| 6,038,302 A | 3/2000 | Burok et al. | 379/201 |
| 6,044,146 A * | 3/2000 | Gisby et al. | 379/266.02 |
| 6,052,460 A | 4/2000 | Fisher et al. | 379/266 |
| 6,061,442 A | 5/2000 | Bhat | 379/269 |
| 6,064,730 A | 5/2000 | Ginsberg | 379/265 |
| 6,064,731 A | 5/2000 | Flockhart et al. | 379/265 |
| 6,070,012 A | 5/2000 | Eitner et al. | 395/712 |
| 6,078,650 A | 6/2000 | Hansen | 379/52 |
| 6,088,441 A | 7/2000 | Flockhart et al. | 379/265 |
| 6,088,442 A | 7/2000 | Chavez, Jr. et al. | 379/265 |
| 6,088,444 A | 7/2000 | Walker et al. | 379/266 |
| 6,091,808 A | 7/2000 | Wood et al. | 379/201 |
| 6,118,861 A | 9/2000 | Gutzmann et al. | 379/201 |
| 6,122,364 A | 9/2000 | Petrunka et al. | 379/265 |
| 6,154,530 A | 11/2000 | Letellier | 379/142 |
| 6,163,606 A | 12/2000 | Otto | 379/211 |
| 6,163,607 A | 12/2000 | Bogart et al. | 379/266 |
| 6,173,053 B1 | 1/2001 | Bogart et al. | 379/266 |
| 6,181,776 B1 | 1/2001 | Crossley et al. | 379/34 |
| 6,188,673 B1 | 2/2001 | Bauer et al. | 370/252 |
| 6,188,762 B1 | 2/2001 | Shooster | 379/265 |
| 6,192,050 B1 | 2/2001 | Stovall | 370/389 |
| 6,192,122 B1 | 2/2001 | Flockhart et al. | 379/266 |
| 6,205,412 B1 | 3/2001 | Barskiy et al. | 703/13 |
| 6,208,721 B1 | 3/2001 | Feinberg et al. | 379/134 |
| 6,215,784 B1 | 4/2001 | Petras et al. | 370/356 |
| 6,222,920 B1 * | 4/2001 | Walker et al. | 379/266.01 |
| 6,226,377 B1 | 5/2001 | Donaghue, Jr. | 379/265 |
| 6,233,332 B1 | 5/2001 | Anderson et al. | 379/265 |
| 6,240,391 B1 | 5/2001 | Ball et al. | 704/270 |
| 6,256,299 B1 | 7/2001 | Chavez, Jr. et al. | 370/329 |
| 6,256,381 B1 | 7/2001 | Donaghue, Jr. | 379/265 |
| 6,272,216 B1 | 8/2001 | Vaios | 379/265 |
| 6,272,544 B1 | 8/2001 | Mullen | 709/226 |
| 6,292,550 B1 | 9/2001 | Burritt | 379/201 |
| 6,295,353 B1 | 9/2001 | Flockhart et al. | 379/265 |
| 6,298,127 B1 | 10/2001 | Petrunka | 379/126 |
| 6,301,354 B1 | 10/2001 | Walker et al. | 379/266.01 |
| 6,314,177 B1 | 11/2001 | Davis et al. | 379/265.12 |
| 6,327,362 B1 | 12/2001 | Hull et al. | 379/265 |
| 6,337,858 B1 | 1/2002 | Petty et al. | 370/356 |
| 6,349,205 B1 | 2/2002 | Fang et al. | 455/419 |
| 6,353,667 B1 | 3/2002 | Foster et al. | 379/265.05 |
| 6,353,851 B1 | 3/2002 | Anupam et al. | 709/204 |
| 6,356,632 B1 | 3/2002 | Foster et al. | 379/265.04 |
| 6,359,982 B1 | 3/2002 | Foster et al. | 379/266.06 |
| 6,366,666 B2 | 4/2002 | Bengtson et al. | 379/265.05 |
| 6,366,668 B1 | 4/2002 | Borst et al. | 379/266.04 |
| 6,377,944 B1 | 4/2002 | Busey et al. | 703/3 |
| 6,385,191 B1 | 5/2002 | Coffman et al. | 370/352 |
| 6,385,302 B1 | 5/2002 | Antonucci et al. | 379/45 |
| 6,385,646 B1 | 5/2002 | Brown et al. | 709/217 |
| 6,389,132 B1 | 5/2002 | Price | 379/265.01 |
| 6,392,666 B1 | 5/2002 | Hong et al. | 345/736 |
| 6,404,747 B1 | 6/2002 | Berry et al. | 370/270 |
| 6,408,066 B1 | 6/2002 | Andruska et al. | 379/265.15 |
| 6,430,174 B1 | 8/2002 | Jennings et al. | 370/352 |
| 6,434,230 B1 | 8/2002 | Gabriel | 379/265.01 |
| 6,445,788 B1 | 9/2002 | Torba | 379/266.08 |
| 6,449,341 B1 | 9/2002 | Adams et al. | 379/9 |
| 6,449,618 B1 | 9/2002 | Blott et al. | 707/101 |
| 6,459,774 B1 | 10/2002 | Ball et al. | 379/67.1 |
| 6,459,788 B1 | 10/2002 | Khuc et al. | 379/265.09 |
| 6,463,346 B1 | 10/2002 | Flockhart et al. | 700/102 |
| 6,470,077 B1 | 10/2002 | Chan | 379/88.01 |
| 6,473,404 B1 | 10/2002 | Kaplan et al. | 370/238 |
| 6,473,505 B1 | 10/2002 | Khuc et al. | 379/265.01 |
| 6,477,559 B1 | 11/2002 | Veluvali et al. | 709/101 |
| 6,480,484 B2 | 11/2002 | Morton | 370/352 |
| 6,480,601 B1 | 11/2002 | McLaughlin | 379/265.11 |
| 6,480,698 B2 | 11/2002 | Ho et al. | 434/632 |
| 6,493,447 B1 | 12/2002 | Goss et al. | 379/265.09 |
| 6,496,831 B1 | 12/2002 | Baulier et al. | 707/101 |
| 6,498,921 B1 | 12/2002 | Ho et al. | 434/362 |
| 6,499,023 B1 | 12/2002 | Dong et al. | 706/46 |
| 6,501,937 B1 | 12/2002 | Ho et al. | 434/362 |
| 6,502,133 B1 | 12/2002 | Baulier et al. | 709/224 |
| 6,505,183 B1 | 1/2003 | Loofbourrow et al. | 706/45 |
| 6,512,415 B1 | 1/2003 | Katz | 329/88.22 |
| 6,526,397 B2 | 2/2003 | Chee et al. | 701/1 |
| 6,535,601 B1 | 3/2003 | Flockhart et al. | 379/266.01 |
| 6,539,090 B1 | 3/2003 | Frey et al. | 379/230 |
| 6,539,538 B1 | 3/2003 | Brewster et al. | 717/115 |
| 6,542,156 B1 | 4/2003 | Hong et al. | 345/440 |
| 6,549,769 B1 | 4/2003 | Harder | 455/418 |
| 6,560,330 B2 | 5/2003 | Gabriel | 379/265.02 |
| 6,560,649 B1 | 5/2003 | Mullen et al. | 709/226 |
| 6,563,788 B1 | 5/2003 | Torba et al. | 370/229 |
| 6,563,916 B1 | 5/2003 | Deutsch et al. | 379/215.01 |
| 6,563,920 B1 | 5/2003 | Flockhart et al. | 379/265.01 |
| 6,567,787 B1 | 5/2003 | Walker et al. | 705/16 |
| 6,570,975 B2 | 5/2003 | Shaffer et al. | 379/220.01 |
| 6,570,976 B2 | 5/2003 | Asada et al. | 379/221.01 |
| 6,571,240 B1 | 5/2003 | Ho et al. | 707/5 |
| 6,574,605 B1 | 6/2003 | Sanders et al. | 705/8 |
| 6,577,720 B1 | 6/2003 | Sutter | 379/144.05 |
| 6,581,105 B2 | 6/2003 | Miloslavsky et al. | 709/238 |
| 6,581,205 B1 | 6/2003 | Cochrane et al. | 717/140 |
| 6,584,439 B1 | 6/2003 | Geilhufe et al. | 704/270 |
| 6,587,545 B1 | 7/2003 | Antonucci et al. | 379/37 |
| 6,587,557 B1 | 7/2003 | Smith | 379/265.01 |
| 6,594,470 B1 | 7/2003 | Barnes et al. | 455/67.7 |
| 2001/0000458 A1 | 4/2001 | Shtivelman et al. | 370/412 |

| | | | |
|---|---|---|---|
| 2001/0021646 A1 | 9/2001 | Antonucci et al. | 455/404 |
| 2001/0038624 A1 | 11/2001 | Greenberg et al. | 370/352 |
| 2001/0040887 A1 | 11/2001 | Shtivelman et al. | 370/352 |
| 2002/0010645 A1 | 1/2002 | Hagen et al. | 705/26 |
| 2002/0073155 A1 | 6/2002 | Anupam et al. | 709/205 |
| 2002/0101854 A1 | 8/2002 | Siegrist et al. | 370/352 |
| 2002/0101866 A1 | 8/2002 | Miloslavsky et al. | 370/386 |
| 2002/0131399 A1 | 9/2002 | Philonenko | 370/351 |
| 2002/0141561 A1 | 10/2002 | Duncan et al. | 379/220.01 |
| 2002/0169834 A1 | 11/2002 | Miloslavsky et al. | 709/206 |
| 2002/0183072 A1 | 12/2002 | Steinbach et al. | 455/456 |
| 2002/0194047 A1 | 12/2002 | Edinger et al. | 705/9 |
| 2002/0194272 A1 | 12/2002 | Zhu | 709/204 |
| 2002/0196277 A1 | 12/2002 | Bushey et al. | 345/745 |
| 2003/0001625 A1 | 1/2003 | Jaussi et al. | 327/65 |
| 2003/0002654 A1 | 1/2003 | Torba | 379/266.08 |
| 2003/0007612 A1 | 1/2003 | Garcia | 379/88.18 |
| 2003/0007625 A1 | 1/2003 | Pines et al. | 379/223 |
| 2003/0013438 A1 | 1/2003 | Darby | 455/419 |
| 2003/0021259 A1 | 1/2003 | Miloslavsky et al. | 370/352 |
| 2003/0026409 A1 | 2/2003 | Bushey et al. | 379/211.02 |
| 2003/0033382 A1 | 2/2003 | Bogolea et al. | 709/218 |
| 2003/0088660 A1 | 5/2003 | Florman et al. | 709/223 |
| 2003/0099342 A1 | 5/2003 | Tiliks et al. | 379/216.01 |
| 2003/0115353 A1 | 6/2003 | Deryugin et al. | 709/231 |
| 2003/0115545 A1 | 6/2003 | Hull et al. | 715/500 |
| 2003/0120395 A1 | 6/2003 | Kacel | 701/1 |

OTHER PUBLICATIONS

CentreVu® Advocate<sup>SM</sup> Research Simulation white paper; "CentreVu Advocate Research Simulation, Environments with CentreVu Advocate"; Lucent Technologies 1999.

CentreVu® Advocate; "Power Call Center Routing that Leaves *Nothing* to Chance"; Lucent Technologies 1998.

Foster, Robin Harris and De Reyt, Stanny; "Re–inventing the Call Centre with Predictive and Adaptive Execution"; The Journal of the Institution of British Telecommunication Engineers, vol. 18, Part 2, pp. 180–184 1999.

"C@ll Center Solutions—1998 Product of the Year"; http://www.praxon.com/news/art_2–99prodofyear.htm.

"Choosing the Best: *CTI*® Magazine's 1998 Products of the Year"; http:/www.tmcnet.com/articles/0199/ctipoty98.htm.

* cited by examiner

METHOD AND SYSTEM FOR SELF-SERVICE SCHEDULING OF INBOUND INQUIRIES

CROSS REFERENCE TO RELATED APPLICATIONS

This application is a continuation-in-part of co-pending patent application Ser. No. 09/547,627, entitled "Method and System for Scheduling Inbound Inquiries" by Duncan, et al., filed on Apr. 12, 2000.

TECHNICAL FIELD

This invention relates in general to the fields of telephony and computer networks, and more particularly to a method and system for scheduling inbound inquires made by telephone or by other electronic messages.

BACKGROUND OF THE INVENTION

Telephone calling centers represent the front line for customer service and marketing operations of many businesses. Typical calling centers receive or make hundreds of telephone calls per day with the aid of automated telephony equipment. With the Internet growing in importance as a way of communicating with customers, calling centers have also evolved to send and respond to electronic messages, such as e-mail or instant messages.

Calling centers often play a dual role of both sending outbound inquiries and answering inbound inquiries. For instance, calling centers use predictive dialers that automatically dial outbound telephone calls to contact individuals and then transfer the contacted individuals to agents when the individual answers the phone. Inbound telephone calls by individuals to the calling center are received by telephony equipment in the calling center and distributed to agents as the agents become available. Calling centers often combine outbound and inbound functions as a way to improve the talk time efficiency of calling center agents. Thus, for instance, when inbound calls have expected hold times that are acceptable, agents may be reassigned to place outbound telephone calls to help ensure that the agents are fully occupied.

One important goal for calling centers that receive inbound inquiries, such as telephone calls or electronic message inquiries, is to transfer the inbound inquiries to appropriate agents as quickly and efficiently as possible. A variety of telephone call receiving devices are commercially available to help meet this goal. One such receiving device is an automatic call distribution system ("ACD") that receives plural inbound telephone calls and then distributes the received inbound calls to agents based on agent skill set, information available about the caller, and rules that match inbound callers to desired queues. Inbound calls may be routed to different queues based on rules and data, allowing a basic prioritization of inbound calls. For example, inbound callers seeking information about a new credit card account might be assigned to a different queue than inbound callers having questions about their account balances. Once assigned to a queue, calls in that queue are generally handled in a first-in-first-out basis. Thus, a caller's hold time generally depends upon the caller's depth in the queue.

Another type of call receiving device is a voice response unit ("VRU"), also known as an interactive voice response system. When an inbound call is received by a VRU, the caller is generally greeted with an automated voice that queries for information such as the caller's account number. Information provided by the caller is typically used to route the call to an appropriate queue. VRUs are used in conjunction with ACDs, but also improve performance of less complex receiving devices such as PBX systems.

As telephony migrates from conventional telephone signals to the use of Internet-based computer networks, voice over internet protocol ("VOIP") will become an increasingly common platform for handling inbound telephone calls. One advantage of VOIP is enhanced access to account information for inbound calls with improved speed and accuracy. For example, conventional ACD and VRU systems collect caller information when inbound calls are received. One example of such caller information is automated number identification ("ANI") information provided by telephone networks that identify the telephone number of the inbound call. Another example is destination number identification system information ("DNIS") which allows the purpose of the inbound call to be determined from the telephone number dialed by the inbound caller. Using this caller information and account information gathered by a VRU or ACD, conventional calling centers are able to gather information on the caller and provide that information to the agent. The use of VOIP improves the integration of data and telephony by passing both data and telephony through a network with internet protocol and by combining voice inquiries with electronic message inquiries, such as e-mail. One example of such integration is the Intelligent Contact Management ("ICM") solution sold by CISCO Systems, Inc. Another example is the integrated response systems available from eShare Technologies, described in greater detail at www.eShare.com, now known as Devine, Inc. at www.devine.com.

Although telephone receiving devices provide improved distribution of inbound telephone calls to agents, the receiving devices are generally not helpful in managing hold times when the number of inbound calls exceeds the agent answering capacity. For instance, customers tend to make inbound calls for service at similar times. A large volume of inbound calls tends to lead to longer wait times during popular calling periods resulting in customer dissatisfaction. As a consequence, during periods of heavy volumes and long hold times, a greater number of inbound callers hang up or "silently" close their accounts by seeking other service providers with better service. Another example of excessive hold times affecting the behavior of inbound callers occurs with telemarketing. The volume of inbound calls in a marketing operation tends to increase dramatically shortly after a television advertisement is aired. Extended hold times result in a greater number of customer hang-ups and lost sales.

The problem of wait time is often exacerbated by customers making inbound inquiries who tend to seek discussions with operators even when automated self-service will provide answers to their inquiries. For instance, a customer making a balance inquiry typically is able to obtain balance information from a VRU without operator assistance. However some customers select an operator option to obtain this information, resulting in unnecessary use of operator resources. While this is generally acceptable for customers who are particularly valued by the service provider, excessive use of operator resources by low value customers tends to increase wait times for all customers, resulting in poor service for higher valued customers.

SUMMARY OF THE INVENTION

Therefore a need has arisen for a method and system which orders inbound inquiries, such as telephone calls, to improve the efficiency of responding to the inbound inquiries.

A further need exists for a method and system that forecasts the behavior of those making inbound inquiries, such as inbound telephone callers, to predict the outcome of an inbound inquiry.

A further need exists for a method and system that applies the forecasted behavior of those making inbound inquiries, such as inbound telephone callers, to order the inbound inquiries for response by agents.

A further need exists for a method and system that solves for an optimum ordering sequence for responding to inbound inquiries.

In accordance with the present invention, a method and system for ordering inbound inquiries is provided that substantially eliminates or reduces disadvantages and problems associated with previously developed methods and systems for responding to inbound inquiries. Inbound inquiry information associated with each inbound inquiry is applied to a model to predict a call outcome and determine a priority value for routing and ordering the inbound inquiry for response relative to other inbound inquiries.

More specifically, inbound inquiries may include inbound telephone calls, e-mails, instant messages, or other electronic messages formats, such as those available through the internet. In an embodiment for scheduling inbound telephone calls, a telephone call receiving device receives plural inbound telephone calls for distribution to one or more agents. The telephone call receiving device may include an ACD, a VRU, a PBX, a VOIP server or any combination of such devices that are operable to receive plural inbound telephone calls and redirect the inbound telephone calls to one or more agents. The inbound telephone calls have associated caller information, such as ANI or DNIS information, which the receiving device interprets. ANI information identifies the telephone number from which the inbound call originates, and DNIS information identifies the telephone number to which the inbound call was directed.

A scheduling module interfaced with or integrated within the receiving device determines an order for the handling of inbound telephone calls based in part on the predicted outcome of the inbound telephone calls. In one embodiment, the scheduling module places the inbound calls in a queue, the queue acting as a virtual hold, and applies a caller model to the caller information associated with the inbound calls in order to forecast the predicted outcome of the inbound calls. The order for handling the inbound calls is based in part on a priority value calculated from the application of a caller model to the caller information by a call evaluation sub-module and based on the capacity of the receiving device. For instance, call outcome forecasts are used to order queues with rules-based criteria. As calls are scheduled by the scheduling module for handling by the receiving device, the scheduling module releases the inbound calls from the virtual hold queue and places the inbound calls in the queue of the receiving device. In an alternative embodiment, the scheduling module or the receiving device may perform real-time scheduling of inbound call inventory by re-ordering queues of the receiving device based on the priority value.

The call evaluation sub-module uses algorithms and models provided by a modeling module that analyzes inbound call histories to forecast outcomes of pending inbound calls. It utilizes the forecasts to compute priority values. For example, in the modeling module, performing logistic regression on prior inbound calls using caller and/or call information and prior call history as independent (or predictive) variables and a dependent variable of caller attrition, provides a model that forecasts pending inbound caller attrition based on the caller and/or call information. Alternatively, performing linear regression modeling on prior inbound calls, using caller and/or call information as independent (or predictive) variables and a dependent variable of connect time, provides a model that forecasts the expected agent talk time for each incoming call.

Predictive variables for the logistic and linear regression equations may include call information such as the originating number or exchange, the originating location, the dialed number, the time of day and the likely purpose of the call. In addition, they may include caller information such as account information derived from association of the originating number and an account data base, or derived from data input by the inbound caller by a VRU. From caller information and/or call information, additional predictive variables are available for forecasting the outcome of the inbound call, including demographic information that may be associated with the call and/or caller.

In one embodiment, the call evaluation sub-module estimates one or more quantities of interest with one or more models provided by the modeling module, and computes the call's priority value based on the quantities of interest. For example, the call value of "the probability of a sale per minute of expected talk time" may be estimated by dividing the estimated probability of a sale by the estimated talk time.

In another embodiment, the call evaluation sub-module uses the estimated quantities of interest to formulate and solve a constrained optimization problem based on conventional mathematical techniques, such as the simplex method for linear problems or the Conjugate gradient and Projected Lagrangian techniques for Non-linear problems. For example, call evaluation sub-module may present a value that represents the solution to maximizing objectives such as agent productivity to either minimize attrition or to maximize product sales.

In another embodiment, the call evaluation sub-module evaluates inbound inquiries to estimate the value of the customer or inquiry and forces low value inquiries into self service. Incoming calls accepted by a call receiving device, such as an ACD or VRU, provide calling information, such as DNIS information or account information provided by the caller, to allow evaluation of the value of the customer, such as an estimation of probable future customer behavior. The caller information is provided to the scheduling module for application to one or more predetermined models that predict behavior of the caller associated with the caller information. For instance, the models predict the tolerance of the caller to automated systems by forecasting probabilities that the caller will remain a customer based on routing of the call and wait time. Alternatively the models predict the probability that the customer will result in predicted outcomes, such as future business or purchases. The scheduling module provides one or more action codes based on model outcomes computed with the caller information, masterfile data, customer data and the models and provides the action codes for the caller to the receiving unit. The receiving unit then uses the action codes to determine whether to route the call to an operator or force the call to self service, such as self service provided through a VRU. The determination for routing calls to self-service may include wait time as a factor, either by inclusion of wait time in the computation of action codes or by having the receiving unit act on action codes based on the wait time.

The present invention provides a number of important technical advantages. One important technical advantage is that inbound inquiries, such as inbound telephone calls, are ordered for response based at least in part on the predicted outcome of the inbound inquiries. This allows, for instance, agents to respond to customers that are more sensitive to holding time before responding to customers who are less sensitive to holding time. This also allows, as another example, enhanced efficiency of handling of inbound telephone calls by seeking to improve the overall outcomes of the inbound calls based on the forecasted outcomes. For instance, in a telemarketing environment, inbound callers with a higher likelihood of purchasing an item or service may be responded to before customers with a lower probability of a purchase outcome. In fact, computing estimated outcomes and then formulating and solving the appropriate constrained optimization problem provides an ordering sequence that maximizes purchases made by inbound callers responding to a television advertisement.

Another important technical advantage of the present invention is that forecasted outcomes are available with minimal caller information. Generally the identity and purpose of inbound calls are difficult to discern because little information is available regarding the inbound caller. The use of statistical analysis of historical inbound calling data allows accurate modeling of outcomes with minimal knowledge of the identity and purpose of the inbound caller.

Another important technical advantage of the present invention is that inbound calls are prioritized based on caller and call information. The present invention allows flexible use in a number of inbound inquiry environments such as telemarketing and customer service environments. Caller models may have different predictive variables depending upon the modeled outcome and the caller information obtained with the inbound inquiry. For instance, telemarketing applications using models that forecast probability of a purchase may focus on predictive variables derived from demographic information based on the origination of the inbound call. In contrast, customer service applications using models that forecast caller attrition may have more detailed predictive variables derived from customer account information. Thus, inbound calling models and objectives may be closely tailored to a user's particular application. Also, estimates of the inbound call talk time may lead to constrained optimization solutions designed to maximize the use of the available agent talk time. Further, an overall response strategy that accounts for electronic message inquiries as well as telephone inquiries is more easily adopted.

Another important technical advantage of the present invention is that forecasted customer behavior allows a determination of the relative value of incoming calls so that inbound call receiving units and operator resources are allocated in a more efficient manner. For instance, customers with a predicted behavior of tolerance to wait times, automated systems or both are handled appropriately to reduce operator work load, thus providing reduced wait times for less tolerant customers. As another example, customers with a high probability of future purchases or other economic benefit are routed with priority over tolerant or low value customers, leading to improved use of available resources.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numeral being used to refer to like and corresponding parts of the various drawings.

Under normal circumstances, inbound telephone calling centers maintain holding times for inbound callers within desired constraints by adjusting the response capacity of the calling center. For instance, during projected or actual periods of heavy inbound calling volume, additional agents may be assigned to respond to inbound calls by adding agents to the calling center or by reducing the number of outbound calls. However, once the overall capacity of a calling center is reached, inbound calls in excess of calling center capacity will generally result in increased holding times for the inbound callers.

Inadequate capacity to handle inbound calls may result from periodic increases in the number of inbound calls during popular calling times, or may result from one time surges due to factors such as system-wide customer service glitches or the effects of advertising. Generally, the excess inbound calls are assigned to hold for an available agent in queues of an inbound telephone call receiving device and are handled on a first-in first-out basis for each holding queue. Often, the result of excessive hold times is that customers having a greater sensitivity to long hold times will hang-up in frustration.

Responding to holding inbound callers on a first-in-first-out basis does not necessarily provide the most efficient results for a calling center. Agent time is used most efficiently when an agent is responding to inbound callers most likely to achieve a desired outcome. For instance, in a telemarketing role an agent is most productive when speaking with inbound callers likely to purchase the marketed service or product. Similarly, in a customer service role, an agent is most productive when speaking with inbound callers who provide a greater rate of profitability to the calling center or business. Thus, routing calls to agents on a first-in-first-out basis does not provide the most efficient use of agent time when inbound callers having a higher probability of a desired outcome are treated in the same manner as inbound callers having a lower probability of a desired outcome. The same principle applies when inbound inquiries are received in alternative formats, such as e-mail or instant messages.

Figure 1:
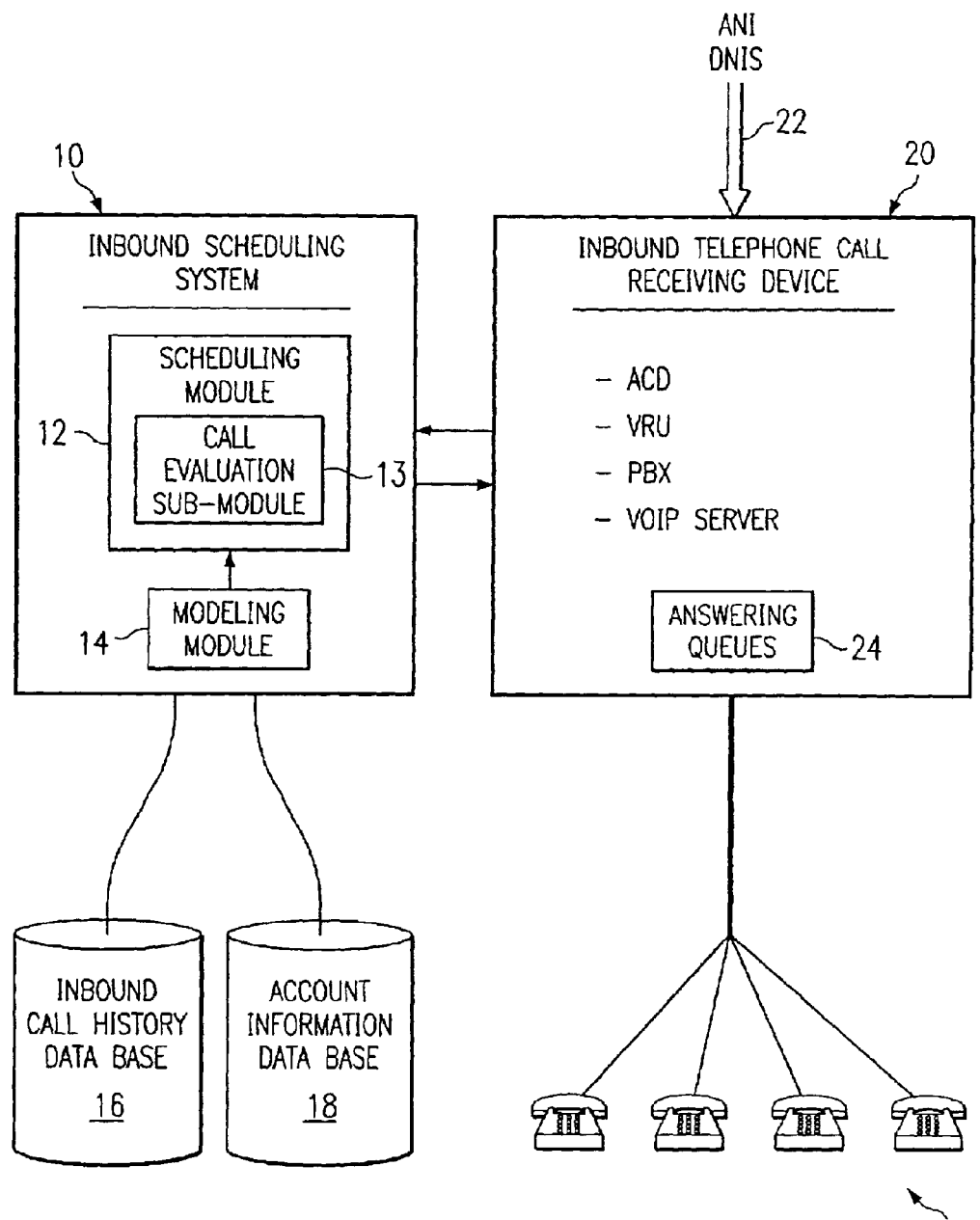
FIG. 1 depicts a block diagram of an inbound telephone call receiving device interfaced with an inbound scheduling system.

Referring now to FIG. 1, a block diagram depicts an inbound scheduling system 10 that schedules inbound telephone calls for response by agents in an order based in part on the predicted outcome of the inbound telephone calls. Inbound scheduling system 10 includes a scheduling module 12, a call evaluation sub-module 13, and a modeling module 14, and is interfaced with an inbound call history data base 16 and account information data base 18. Modeling module 14 builds one or more models that forecast the outcomes of inbound calls using inbound call history from data base 16 and/or from account information of data base 18. Scheduling module 12 applies the models to forecast outcomes of pending inbound calls and schedules an order for agents to respond to the pending inbound calls based on the call evaluation sub-module 13. Modeling module 14 builds statistical models and call evaluation sub-module 13 computes the priority value which is used by scheduling module 12. The priority value is the result of computations based on the models, but also of solutions to optimization problems that may be defined on computations based on the models.

Inbound scheduling system 10 interfaces with an inbound telephone call receiving device 20. Scheduling system 10 and receiving device 20 may be integrated in a single computing platform, or may be based on separate computing platforms interfaced with proprietary application programming interfaces of the receiving device 20 or interfaced with commercially available application middle ware such as Dialogic's CT Connect or Microsoft's TAPI. Inbound telephone call receiving device 20 is a conventional telephony device that accepts inbound telephone calls through a telephony interface 22, such as conventional T1 or fiber interfaces. Inbound telephone call receiving device 20 may include an ACD, a VRU, a PBX, a VOIP server or any combination of such conventional devices. Inbound telephone calls received through interface 22 are distributed to one or more answering queues 24 for response by agents operating telephony devices 26. Although FIG. 1 depicts an embodiment of the present invention that orders inbound telephone calls, alternative embodiments apply scheduling module 12 and modeling module 14 to schedule other types of inbound inquiries, such as e-mail or instant message inquiries, by interfacing inbound scheduling system 10 with an appropriate inbound receiving device, such as an internet server.

Inbound telephone call receiving device 20 accepts inbound telephone calls through interface 22 and obtains caller information associated with the inbound calls such as ANI and DNIS information. When receiving device 20 includes a VRU, additional caller information, such as account information, is obtained through automated interaction with the inbound callers. For instance, a VRU may query an inbound caller to provide an account number or a reason for the call, such as to open a new account, to change account information, to check account information, to purchase a particular service or item, or to collect inbound caller information when ANI is not operative, such as when caller-ID is blocked. In an alternative embodiment, inbound inquiries may include e-mail or instant messages that provide inquiry information based on login ID, e-mail address, IP or instant message address. In such an embodiment, additional information can be gathered by an automated e-mail or instant message survey response that requests a phone number, purchase interest, account number or other relevant information. For Internet inquiries, cookies may assist in gathering information. Further, inbound calling information may be used to cross check and update other customer information, such as for outbound calls and skip tracing.

Receiving device 20 passes the caller information to scheduling system 10, such as through a data query, and awaits a response from scheduling system 10 before allocating the inbound call to an answering queue. In addition, receiving device 20 provides scheduling system 10 with agent activity and capacity. For instance, a receiving device 20 may include both a VRU and an ACD with the ACD providing agent activity information. When receiving device 20 includes a VRU, an "out of order" response may be provided by scheduling system 10 when operator capacity is unavailable or in high use, meaning that the first call in is not necessarily the first call out.

Scheduling module 12 keeps inbound calls in a queue that acts as a virtual hold until a response is desired and then releases the inbound call for placement in an answering queue 24. Thus, scheduling system 10 responds to queries from receiving device 20 based on the priority of the inbound call, essentially creating an ordered queue on receiving device 20 by delaying the response to inbound calls having lower priorities. In one alternative embodiment, scheduling module 12 may re-order queues directly within receiving device 20 to allow real-time ordering of inbound telephone call queues.

Scheduling module 12 obtains data to apply to a caller model by performing a look-up based on the caller information received from receiving device 20. Caller information may include account number, zip code, area code, telephone exchange, reservation number or other pertinent information obtained from the inbound caller, such as with a VRU, or derived from information obtained by the receiving device 20 with the inbound call, such as ANI or DNIS information. The nature of caller information depends upon the implementation of scheduling system 10 and is generally configurable through a graphical user interface provided with conventional receiving devices. In addition to the caller information, scheduling module 12 may query and join data from other sources such as zip+4 and credit bureau sources and demographic information otherwise derivable from the caller information.

When sufficient capacity exists for response by receiving device 20, scheduling system 10 releases calls immediately back to receiving device 20. In other words inbound calls are not delayed if sufficient capacity exists to handle the inbound calls, but are routed for immediate answering. When capacity is tight on receiving device 20, calls are delayed on a virtual hold by scheduling system 10 until an appropriate time based on the priority value computed by the call evaluation sub-module 13. Whether or not inbound calls are delayed, scheduling system 10 gathers and stores data for the inbound calls in the inbound call history data base 16. The outcome of inbound calls is also gathered and stored along with forecasted outcomes to provide a detailed call-by-call history for use in future modeling and for verification of forecasted outcome versus actual outcome. For instance, once an inbound call is completed, results such as a successful connect with an agent, an abandoned call, a purchase, or customer attrition from billing records are associated with inbound calls.

Modeling module 14 creates caller models by performing statistical analysis on appropriate data taken from inbound call history data base 16 and account information data base 18. The statistical analysis performed by modeling module 14 builds models by associating the outcome of a call (i.e., the dependent variable) to the information available when the call is received (i.e., the independent variables) The end result of each model is equations that when computed provide a forecast for the outcome of interest (e.g., agent talk time, sale: yes/no, account cancelled within x days: yes/no). The application of caller models to caller and/or call information may be performed as calls arrive, or may be performed preemptively to calculate potential action codes in the beginning of a time period to provide more rapid response when circumstances warrant.

One type of statistical analysis appropriate for modeling discrete outcomes (e.g., sale: yes/no, account cancelled within x days: yes/no) is logistic regression. Some examples of forecasted outcomes include estimating probability an inbound caller will hang up in a predetermined hold time, the probability a customer will cancel an account, or the probability the customer will make a purchase. As an example, the following logistic regression equation forecasts the probability of purchase based on the independent variables income and age:

$$\exp(a_0+a_1*age+a_2*income)/[1+\exp(a_0+a_1*age+a_2*income)]$$

where:

$a_0$=a constant representing the model's intercept
$a_1$=the parameter for the predictive variable age
$a_2$=the parameter for the predictive variable income Another type of statistical analysis appropriate for modeling continuous outcomes, such as talk time or sale amount, is linear regression. For example, the following linear regression equation forecasts agent talk time ("TT") based on independent variables time-on-books ("TOB"), time-of-day between 8–9 am ("TOD"), balance ("BAL") and delinquency level("DL"):

$$TT=b_0+b_1 TOB+b_2 TODflag+b_3 BAL+b_4 DL$$

$b_0$=a constant representing the model's intercept
$b_1$=the parameter for the predictive variable TOB
$b_2$=the parameter for the predictive variable TOD (i.e., Was the call between 8–9 (1=yes, 2=no))
$b_3$=the parameter for the predictive variable BAL
$b_4$=the parameter for the predictive variable DL In alternative embodiments, statistical models that forecast outcomes may be developed by a number of alternative techniques. For instance, neural networks, classification and regression trees (CART), and Chi squared automatic detection (CHAID) are statistical techniques for modeling both discrete and continuous dependent variables. Another example is cluster analysis, which, with an association of the resulting cluster assignment equations to the dependent variables allows for simplified models or may be used to improve the effectiveness of other techniques. Each alternative statistical technique will result in different forecasting equations which may have advantages for different types of forecasting circumstances. Essentially, however, each type of equation will associate an outcome as a dependent variable with the call and caller information available while the call is processed as independent variables. In general mathematical terms, for each possible discrete outcome, such as sale: yes/no, account cancelled within x days: yes/no, where i=1, . . . M:

$$\mathrm{Prob}(outcome=i)=f_i(x(1), x(2), \ldots x(N))$$

where:

x(i) stands for the ith independent variable, and
$f_i(x(1), x(2), \ldots x(N))$ stands for the modeling equation for outcome i and can take different forms depending upon the statistical technique chosen For each continuous outcome, such as talk-time or amount of sale:

Estimate of dependent variable=$g(x(1), x(2), \ldots x(N))$ where:

x(i) stands for the ith independent variable, and
$g(x(1), x(2), \ldots x(N))$ stands for the modeling equation, and can take different forms depending upon the statistical technique chosen.

Forecasted outcomes and predictive variables are user defined, and depend on the inbound inquiries being scheduled. As an example, for inbound inquiries related to a solicitation effort, such as telephone calls following a TV advertisement, the outcome may be: yes/no/hang-up; amount of purchase (continuous); amount by type of product (continuous) split by product type; approval of a credit application yes/no. As another example, for customer service inquiries, exemplary outcomes may be: customer satisfaction yes/no; closure of account within x days yes/no; change in loan balance within x days (continuous); or dispute with a positive resolution/dispute with a negative resolution/no dispute. Other types of outcomes that may be of interest to both post-solicitation and customer service inquiries include: agent talk-time (continuous); agent talk time by type of agent (continuous split by agent type, such as general/supervisor/specialist).

The selection of predictive variables depends upon the type of data available and the circumstances of the outcome which is being forecasted. For example, in a situation in which the inquiries come from individuals known to the calling center, data available for predicting outcomes may include: account information; application information, such as employment, age, income, bank account information; relationship data such as other account information; results of other modeling efforts, such as behavior and response scores; credit bureau data; check clearing data; e-mail domain information; and trigger events, such as solicitations, TV advertisements, and account statements. When geographic location of the call or caller can be established, this may yield additional predictive data, such as zip+4 credit bureau information, census demographics, and third party models, such as credit bureau clusters. Data available from a call itself may include information input through a VRU, including branch sequence and initial number called, and the time at the place of the origination of the inbound inquiry. In addition, the call environment itself may provide data based on the types and number of calls received in a recent period of time, the type and number within a period of time, such as a particular hour or day, and the results provided by the calls.

Once the modeling equations are applied and outcomes such as probability of purchase or expected talk time are estimated, the call evaluation sub-module computes the priority value. In one embodiment of the invention, the priority value of a call might be the estimated probability of a purchase. Inbound calls having higher probabilities of purchase may be answered first. In another embodiment, the priority value of a call might be given by dividing the estimated probability of purchase by the expected talk time of the call. The most productive calls are given are given a greater priority value for response by an agent. In this way, agent productivity is implicitly improved since a greater portion of the agent's time is spent talking with potential customers having a higher probability of making a purchase.

In another embodiment of the invention, scheduling module 12 orders inbound inquiries to explicitly optimize a desired outcome, such as a maximum number of purchases or a minimum number or losses due to attrition, taking into account the limitations of the environment operating at the time. Quantities of interest, such as probability of a sale, probability of attrition, or expected talk time, are estimated with models generated by modeling module 14. The estimated quantities of interest are used to solve a constrained optimization problem with conventional mathematical techniques, such as the simplex method for linear problems or the Conjugate gradient and Projected Lagrangian techniques for Non-linear problems.

One example of optimization applied to inbound telephone calls is the maximization of agent productivity to minimize attrition of inbound callers, as illustrated by the following equation:

$$\text{Min sum } x(i)*(p_2(i)-p_1(i))$$

$$i=1,\ldots N$$

Subject to:

$$\text{sum } x(i)*t(i) =< T$$

$$i=1,\ldots N$$

$$x(i) \text{ in } (0,1)$$

where:

$x(i)$ (the decision variable) denotes whether call i should be kept or dropped $p_1(i)$ is the estimate for the probability of attrition for the caller's account if the call is not answered $p_2(i)$ is the estimate for the probability of attrition for the caller's account if the call is answered $t(i)$ is the estimate of the expected talk-time for call i T is the total available Agent time for a user-defined time interval N is the number of calls in queue Once the constrained optimization problem is solved, letting Q be the optimal dual variable for the talk-time constraint, the call priority value may be given by the reduced objective value: $p_2(i)-p_1(i)-Q*t(i)$.

Another example of optimization applied to inbound telephone calls is the maximization of agent productivity to produce sales to inbound callers, as illustrated by the following equation:

$$\text{Max sum } x(i)*q(i)$$

$$i=1,\ldots N$$

Subject to:

$$\text{sum } x(i)*t(i) =< T$$

$$i=1,\ldots N$$

$$x(i) \text{ in } (0,1)$$

where:

$x(i)$ (the decision variable) denotes whether call i should be kept or dropped $q(i)$ is the estimate for the probability that the call will result in a sale $t(i)$ is the estimate of the expected talk-time for call i T is the total available Agent time for a user-defined time interval N is the number of calls in queue.

Once the constrained optimization problem is solved, letting R be the optimal dual variable for the talk time constraint, the call priority value may be given by the reduced objective value: $q(i)-R*t(i)$.

Although FIG. 1 depicts an embodiment of the present invention that orders inbound telephone calls, alternative embodiments apply scheduling module 12 and modeling module 14 to schedule other types of inbound inquiries, such as e-mail or instant message inquiries, by interfacing inbound scheduling system 10 with an appropriate inbound receiving device, such as an internet server. The scheduling module may be receiving inbound inquiries from a plurality of sources (e.g. ACD, VRU, internet server) and returning priority values to unified or separate pools of agents.

Figure 2:
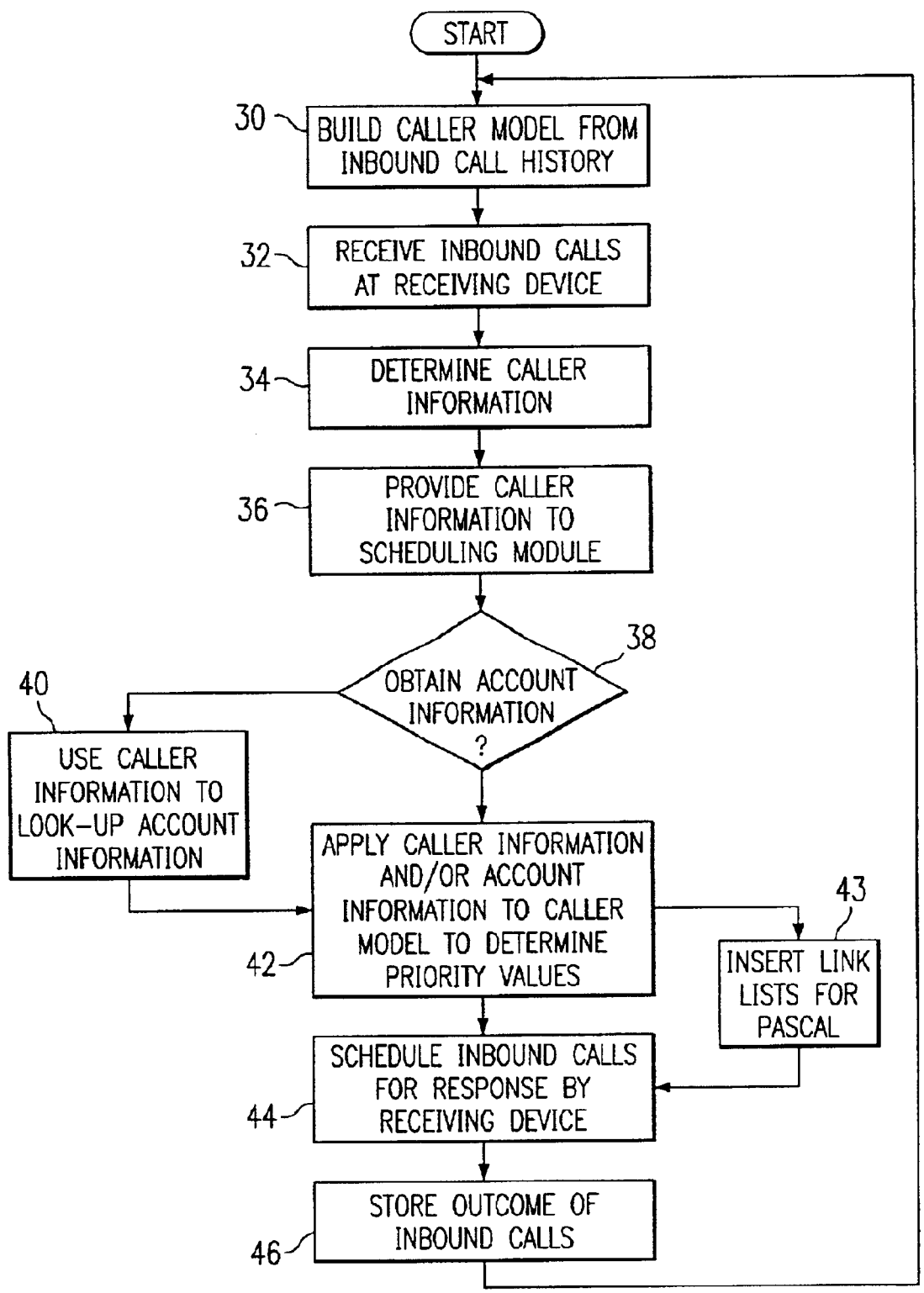
FIG. 2 depicts a flow diagram of a method for ordering inbound callers for response by agents.

Referring now to FIG. 2, a flow diagram depicts a process for scheduling inbound calls for response by an agent. The process begins at step 30 with the building of models from inbound call history. The inbound call history used to model the outcomes of interest may be a sample drawn from historical inbound calls of the same nature as the outcomes to be modeled or may be specifically designed during a test phase. For instance, a television advertisement aired in a single or limited number of television markets representative of the total targeted audience may be used to generate inbound calls having a volume within the capacity constraints of the calling center. The outcome of the inbound calls from the sample advertisement may then be used to create a model specific to the nature of the product sold by the advertisement. The advertisement-specific model is then used for the time periods during which the advertisement is presented to wider audiences so that inbound calls having a greater probability of resulting in a purchase will have a higher priority for response by an agent.

At step 32, inbound calls are received by the receiving device. Generally, inbound calls arrive continuously at the receiving device at rates that vary over time. The receiving device answers the inbound calls in a conventional manner and, at step 34, determines call and/or caller information. Call and/or caller information is determined through analysis of ANI or DNIS information that arrives with inbound calls and also through data gathering such as by interaction with a VRU.

At step 36, call and/or caller information is provided to the scheduling module for a determination of a priority value based on the forecasted outcome of the inbound call. At step 38, the scheduling module determines if additional information is needed for calculation of the outcome forecast. For instance, account information may be acquired by the receiving device and passed to the scheduling module, or the scheduling module can acquire all or part of the information. If additional information is needed, at step 40, caller information is used to obtain additional account or demographic information. At step 42, the caller model is applied to caller information, account information and/or demographic information to determine a priority value for the inbound call. At step 43, in one embodiment, the receiving device sorts queues according to the priority value, reducing or eliminating the need for a virtual hold by the release of calls from the scheduling module. For instance, a linked list for receiving devices that support lined list data structures may be used to aid in the scheduling of inbound calls.

At step 44, inbound calls are scheduled for response by an agent interfaced with the receiving device. Inbound calls having lower priority values are placed on virtual hold while inbound calls having higher priority values are returned to the receiving device and placed in a queue for response by an agent. The length of a virtual hold for an inbound call depends upon the volume of inbound calls, the capacity of the receiving device, the talk time of the agents per call and the priority value of an inbound call relative to other pending inbound calls. Based on these factors, an inbound call is placed in virtual hold time and is forwarded to the receiving device in priority value order when agent resources are available and/or when a maximize hold time parameter has been exceeded. Alternatively, in embodiments in which the receiving device can sort or change the order of an inbound queue based on available data including the priority value, the inbound queues of the receiving device may be re-ordered on a real-time basis as additional inquiries are received.

At step 46, the outcome of inbound calls is stored in the inbound call history data base. The inbound history data base tracks factors such as call success or abandonment and ultimate call outcome. Call outcome may include directly quantifiable factors such as a purchase decision or less quantifiable factors such as customer satisfaction as reflected by account usage, cancellations and related information that is derivable from account databases and other sources.

One example of an application of the inbound scheduling system is a credit card service calling center. Customers tend to make inbound calls at similar times of the day which leads to longer hold times when inbound call volumes are high. Often, inbound callers hang up or simply just "silently" close their account when hold times are excessive for that caller. Other customers are less sensitive to hold times and thus less likely to alter their purchasing habits or account status as a factor of hold times. The scheduling system enhances the overall benefit from inbound telephone calls by providing a higher priority to inbound calls that are forecasted to have a desired result, such as increased account usage. Further, the effectiveness may be tested with champion/challenger testing that compares results of subsets of inbound calls in which one segment is prioritized and the other segment is not prioritized or is prioritized with a different priority strategy.

Another example of the present invention is an application for an integrated response center that simultaneously accepts inquiries from different types of communication media, such as simultaneous inquires from telephone calls, VOIP, e-mails and instant messages. In such an environment, agent response to inquiries may be via the same media as the inquiry or through cross-channel communication. For instance, an e-mail inquiry may result in an e-mail response or, alternatively, in a telephone call response. Further, the priority of the response may depend, in part, on the media of the inquiry. For instance, generally an e-mail inquiry will have a lower priority than a telephone inquiry since a customer generally will not expect as rapid of a response when the customer sends an e-mail inquiry. However, if the customer who sent the e-mail inquiry has a high probability of purchase, an immediate response by a telephone call might provide a better sales outcome for an agent's time, even if a telephone inquiry with a customer having a low probability of purchase is left on hold while the agent places an outbound call.

In a highly constrained resource environment, particularly low priority inquiries, such as inquiries with a low probability of purchase, may be scheduled for outbound attempts at a later time in order to preserve response resources for higher priority inquiries. For instance, a low priority inbound telephone caller may be given a voice message that informs the caller of an excess wait time and that he will be contacted at a future time. The future time is determined by the caller's priority compared with the actual and projected priority of other inbound inquiries and the capacity of the agents to respond to the inquires. Thus, if the capacity of the available agents is projected to exceed inbound inquiry demand and higher priority inquiry backlog in two hours, the low priority inbound caller may be given a message to expect a call in two hours. Similarly, an automated e-mail message may be provided to an e-mail inquiry informing the e-mail inquirer that he may expect a response at a specific time. In this way, inquiries are scheduled for outbound contact attempts on a prioritized basis rather than on a first-in-first-out basis. In one alternative embodiment, the inquirer may be prompted for the best time and communication channel, and an outbound contact attempt will be attempted at that time.

Figure 3:
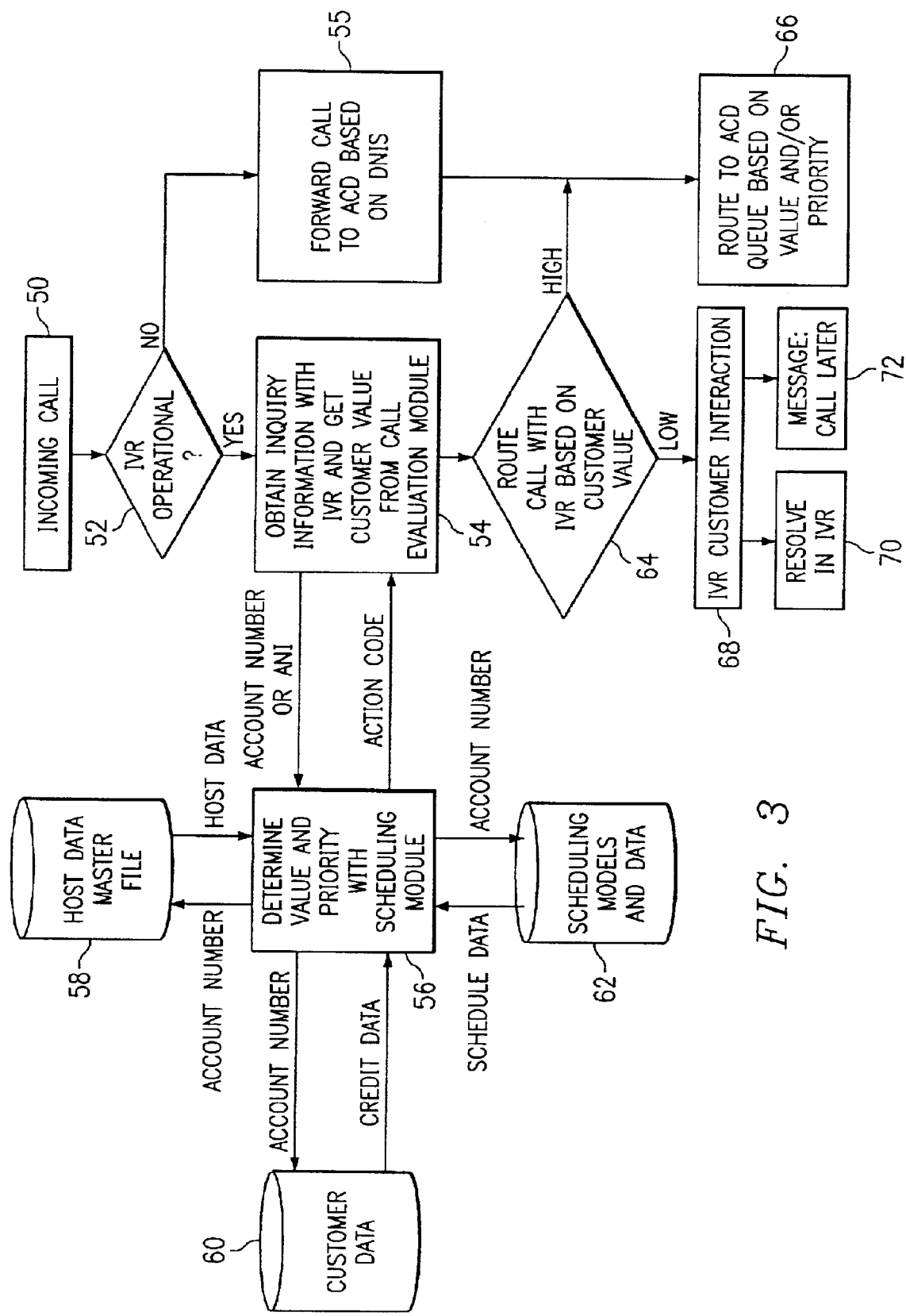
FIG. 3 depicts a flow diagram of a method and system for routing inbound calls to self service.

Referring now to FIG. 3, a flow diagram depicts the routing of inbound calls to force low value inbound calls to self service. The value of the incoming call is determined based on predictions of the behavior of the caller, such as the caller's toleration to wait time and probabilities of caller decisions to purchase goods or services. Low value calls are forced to self service to preserve operator resources for high value calls.

Incoming calls arrive at step 50, such as through a telephone or Internet switch, for handling by a receiving device, such as a VRU or ACD. At step 52, a determination is made of whether the receiving device is able to accept customer information, such as whether a VRU is operational. If not, the call is forwarded to operators for handling at step 55 so that inbound calls are not interrupted by a VRU failure. If the VRU is operational, then at step 54, inquiry information is obtained and forwarded to the scheduling module to enable a determination of the value of the call.

At step 56, the scheduling module accepts caller information, such as ANI or DNIS codes or information input to the VRU, such as account information. The scheduling module then computes an action code for the incoming call by reference to masterfile data 58, customer data 60 and scheduling models and data 62. For instance, the scheduling module may apply a model formulated through logistic regression to predict caller behaviors. One example of caller behavior is tolerance to call waiting time. A low tolerance to waiting time may be indicated by a high probability of the caller closing his account if hold times to talk to an operator exceed a predetermined amount. Another example of a caller behavior is low tolerance to automated devices. A low tolerance to interaction with automated devices may be indicated by a high probability of closing his account if it is handled by an automated device such as a VRU. Other customer behaviors include low value behaviors that are more economically served through automated rather than personal interaction. For instance, low value incoming calls might include calls to close an account, balance inquiries, payment inquiries, address changes and accounts with a low probability of future orders.

The scheduling module determines an action code for each incoming call based on a predicted behavior determined by a model or models and forwards the action code to the receiving device. For instance, an action code may direct the receiving device to perform a predetermined action on the incoming call, such as forwarding the call to a predetermined ACD queue or forcing the call to self service by a VRU. An action code provides a value for the incoming call, such as a probability of revenue of predetermined amount associated with the call or with the caller's continued business or an estimation of the caller's toleration to wait time. The receiving device uses the action code to route the call in an efficient manner with the call destination determined based on the action code and operator capacity or wait time. In alternative embodiments, the scheduling module may be incorporated within a VRU or ACD to directly control the receiving unit, such as with a software module.

At step 64, the receiving device routes each incoming call based on a determination of the call's value from the action code. High value calls proceed to step 66 where they are forwarded to an appropriate ACD queue for attention by an operator. Low value calls proceed to step 68 where they are forced into self service by a VRU. The decision to route calls as high or low value is determined by reference to the action code for a given capacity. For instance, if call wait times are relatively low, a greater number of calls may be handled by operators so that calls with lower relative priority may be routed as high value calls. If call wait times are relatively long, calls with higher relative priority may be forced to self service. In this manner, wait time for operators is regulated while the impact of wait length is minimized relative to the projected value of the inbound inquiry. In particular, the relative weight of caller tolerance to wait time allows the forwarding of calls so as to minimize impact on service levels for high value calls where wait time impacts predicted customer behavior, such as customer behavior predicted based on forecasted outcomes. Although, for given operator resources, actual average wait times for inbound inquiries may increase overall, average wait times will decrease when weighted by the projected value of inbound inquiries, resulting in improved operator utilization and increased high-value customer satisfaction.

Calls forced to self service at step 68 may be handled in a number of different manners in order to avoid the use of operator resources. For instance, at step 70, calls are resolved through use of automated interaction with a VRU that does not provide the caller with an option to contact an operator. If an automated response is unavailable or undesirable, at step 72 the caller is provided with a message to call back at a suggested time having lower call volume. In alternative embodiments, automated responses may include e-mail or instant message interaction. In one embodiment, customer reactions to self service are tracked to provide more effective responses. For instance, a customer who hangs up when sent to self service and then tries again after a brief defined delay may be directed to an operator since the customer's response to self service is poor.

Although FIG. 3 depicts the handling of inbound telephone calls, the handling of other inbound inquiries, such as with an integrated response center, allows a comprehensive solution for directing inbound inquiries to self-service of various levels. For instance, e-mail and instant messenger inbound inquiries are analyzed by models to forecast probable outcomes, allowing more efficient response by an integrated response center, including telephone, instant messenger and e-mail responses. To balance resource allocation of an inbound inquiry response center, inbound e-mail and instant messenger inquiries having low projected value might receive automated messages that a response will be delayed or that the inbound inquirer should use a Web site reference for self-help. In contrast, inbound e-mail or instant messenger inquiries having a high projected value might receive more rapid routing or a telephone call response.

One example of an integrated response available for inbound inquiries of higher projected value is the use of collaborative browsing. Collaborative browsing allows a customer assistant representative to help a customer through a "co-browsing" feature. Software loaded on the customer's computer allows the service representative to interact with a customer by using the customer's Web browser. For example, a B2B customer having a high projected value, predicted by one or more models that use inquiry or customer information as independent variables may have a greater amount of inbound inquiry response resources allocated to him. To make additional response resources available, additional inbound inquiries having lower projected values are assigned to self service. As an alternative or additional response resource for inbound inquiries with high projected value, a response representative or bandwidth assignment for collaborative browsing may be provided. The customer service representative may, for instance, walk the customer through ordering from a Web page as though the customer were using his own mouse and keyboard. Collaborative browsing may include e-mail, fax, regular telephone and Internet telephone contact as part of the interaction. Effectively, collaborative browsing allows a service representative to be on the same page as his customer.

Although the present invention has been described in detail, it should be understood that various changes, substitutions and alterations can be made hereto without departing from the spirit and scope of the invention as defined by the appended claims.

What is claimed is:

1. A method for identifying inbound telephone calls for handling by self service, the method comprising:

developing one or more models from a history of inbound calls, the history having caller information and outcome results from inbound telephone calls;

applying the one or more models to caller information associated with a pending inbound call to predict an outcome of the pending inbound call; and forcing inbound telephone calls having a predetermined predicted outcome to self service.

2. The method of claim 1 wherein the caller information comprises telephony information received with the pending inbound caller.

3. The method of claim 1 wherein the predicted outcomes relate to the tolerance of the inbound call to a predetermined wait time.

4. The method of claim 1 wherein the predicted outcomes relate to the probability of a sale to the inbound call.

5. The method of claim 1 wherein the predicted outcomes relate to forecasted revenue associated with the inbound call.

6. The method of claim 1 wherein the caller 30 information further comprises information input by the caller through a voice response unit.

7. The method of claim 1 wherein developing a model further comprises:

using the caller information as predictive variables that model outcome results.

8. The method of claim 7 wherein the model comprises a logistic regression model.

9. The method of claim 7 wherein the model comprises a linear regression model.

10. The method of claim 7 wherein the model comprises a neural net model.

11. The method of claim 7 wherein the model comprises a linear regression model.

12. The method of claim 7 wherein the model comprises a CHAID model.

13. The method of claim 7 wherein the model comprises clustering.

14. The method of claim 1 further comprising:

placing pending inbound calls that are not forced into self service into the queue of an automatic call distribution system in an order based on the predicted outcome of the pending inbound call.

15. The method of claim 14 wherein the predicted outcomes relate to purchase probabilities resulting from the pending inbound call.

16. The method of claim 1 wherein forcing inbound telephone calls having a predetermined predicted outcome to self service further comprises forcing a predetermined volume of inbound calls to self service to regulate operator utilization.

17. A system for scheduling inbound calls, the system comprising:

a receiving device operable to receive plural inbound inquiries and to provide the inbound inquiries to one or more agents, the receiving device having self service and operator service; and a scheduling module interfaced with the receiving device, the scheduling model operable to force predetermined inbound inquiries to self service handling by the receiving device, the determination of self service based in part on the predicted outcome of the inbound inquiries.

18. The system of claim 17 wherein the inbound inquiries comprise inbound telephone calls.

19. The system of claim 17 wherein the receiving device comprises an automatic call distribution system.

20. The system of claim 17 wherein the receiving device comprises a server that supports voice over internet protocol.

21. The system of claim 17 wherein the receiving device comprises a voice response unit.

22. The system of claim 17 further comprising:

an inbound call history data base operable to store outcome results and caller information from plural completed inbound calls; and a modeling module interfaced with the history database and operable to model inbound call outcomes from the stored outcome results and caller information.

23. A system for regulating caller wait times for inbound calls, the system comprising:

a telephone call receiving device interfaced with a network to receive plural inbound calls; and a scheduling system associated with the receiving device and having a scheduling module that prioritizes the inbound calls in accordance with forecasted outcomes for the inbound calls;

wherein the scheduling system forces one or more inbound calls to self service to regulate caller wait time, the scheduling system forcing predetermined inbound calls to self service based on the forecasted outcome of the inbound call.

24. The system of claim 23 wherein the telephone call receiving device comprises an automatic call distribution system that incorporates the scheduling system.

25. The system of claim 23 wherein the scheduling system forecasts outcomes with models derived from a history of inbound calls.

26. The system of claim 23 wherein the scheduling system orders the inbound calls to optimize an objective function.

27. The system of claim 26 wherein the objective function comprises agent productivity to minimize inbound call attrition.

28. The method of claim 27 wherein call attrition comprises abandoned calls.

29. The method claim 27 wherein call attrition comprises account termination by the inbound inquirer.

* * * * *